May 7, 1968  R. J. McDONAGH  3,381,806
EYEGLASSES HOLDER AND WIPER
Filed Jan. 9, 1967
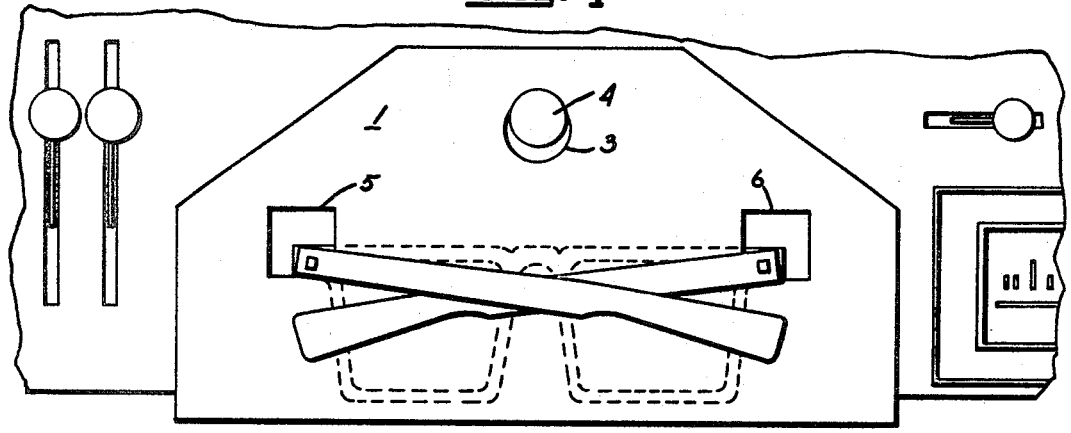
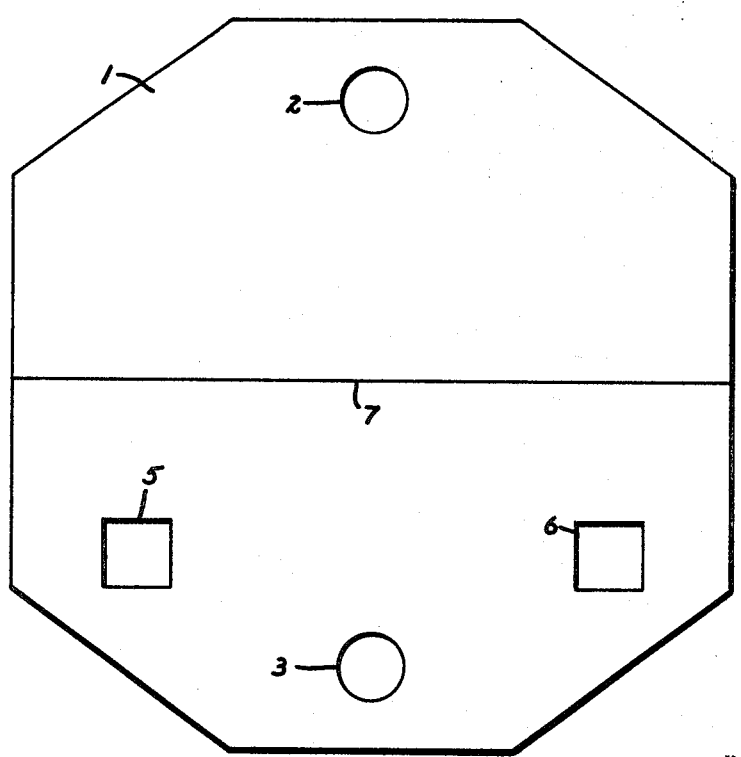
INVENTOR.
ROBERT J. McDONAGH
BY
ATTYS.

3,381,806
EYEGLASSES HOLDER AND WIPER
Robert J. McDonagh, 106 Randolph St.,
Caldwell, Idaho 43724
Filed Jan. 9, 1967, Ser. No. 608,172
3 Claims. (Cl. 206—5)

ABSTRACT OF THE DISCLOSURE

The device is a holder for eyeglasses which can be hung on any suitable support such as a knob on the instrument panel of an automobile. It is composed of a soft fiber which is used to wipe the lens and which can be readily disposed of after use.

Disclosure

The present invention relates to a readily disposable or "throw away" holder for eyeglasses which is provided with means to secure the eyeglasses therein and with means to hang the holder on a support. The holder is flexible and soft, being composed of a soft sheet of a nature that it can be used to wipe foreign matter from the glasses. It may be impregnated with any suitable material that will improve its cleaning qualities. The strength is adequate to prevent tearing in normal use while carrying the glasses on a support such as a knob on the instrument panel of an automobile.

A preferred embodiment of the invention is shown in the accompanying drawings wherein:

FIG. 1 is a front view of the holder showing it with eyeglasses carried therein and showing it suspended on a knob on the instrument panel of an automobile;

FIG. 2 is a plan view showing the holder opened up; and

FIG. 3 is a sectional view of the holder.

The invention as shown comprises a sheet 1 which is composed of a tough very flexible fibrous material such as is now readily available for shoe shining strips. This material has a base of cellulose fibers with a binder which holds the fibers together so as to prevent shedding of "lint." For want of a more fitting term it is referred to hereinafter as a non-lint shedding, pliable fibrous sheet having a surface capable of receiving particles of dust and dirt and removing the same from glass surfaces.

The sheet 1 is provided at two opposed places near its border with apertures 2 and 3 which are large enough to receive a support such as one of the knobs found on the instrument panels of automobile. In attaching the device both apertures receive the support 4 thus folding the mid portion of the sheet 1 to a double thickness.

At equal distances from the aperture 3 two more apertures 5 and 6 are provided in the sheet. These apertures are offset toward the other support receiving aperture 2, and are spaced apart a distance substantially equal to the distance between the bows of eyeglasses. The apertures 5 and 6 are preferably rectangular in shape and large enough to allow for small variations in the spacing of the bows and in the cross-sectional dimensions of the bows. A size of ¾ inch by ¾ inch for the apertures 5 and 6 is ample to allow for the variations in distance between the fastening of the bows to the lens supporting frames. The apertures 5 and 6 should be set inward from the edge of the sheet nearest to the aperture 3 about a distance of 1¾ inches when the sheet is 8 inches across between the edges adjacent to the apertures 2 and 3.

To use the eyeglass holder the bows of the eyeglasses are passed through the two apertures 5 and 6 in such manner that the lenses of the eyeglasses are toward the center of the sheet 1. The sheet folds over the eyeglasses to cover them and bring the two apertures 2 and 3 into alignment for hanging on a support 4. This is the position shown in FIG. 1 of the drawings. The eyeglasses are protected from dust, etc. while they are carried this way. When they are to be worn, the holder 1 can be opened by removing the aperture 3 from the support 4. The holder 1 can be used to wipe away any foreign matter from the lenses. A supply of the sheets 1, pre-folded if desired, can be carried on the support 4 or elsewhere nearby so that a clean holder is readily available for the eyeglasses when they are removed from the eyes.

The particular peripheral outline of the sheet 1 can be varied greatly without interfering with its utility. It is shown as a square sheet with the corners cut off, but various other shapes work equally well. The important features of the sheet lie in providing the opposed apertures 2 and 3 on opposite sides of a median line 7 and far enough apart to permit the placing of the apertures 5 and 6 far enough from the aperture 3 to assure clearance of the support 4 by the mid portions of the eyeglasses when the holder is being placed on the support.. The median line 7 must be far enough from the apertures 5 and 6 to provide ample space for the lens frames of the eyeglasses.

The advantages of my invention lie in the convenience and low cost of the holders. To make them it is only necessary to cut the sheets 1 and to punch the four apertures 2, 3, 5 and 6 in them. They can be packed and sold flat or pre-folded along the median line 7.

Having described my invention I claim:

1. A holder and wiper for eyeglasses comprising a sheet of non-lint shedding pliable material capable of wiping foreign matter from eyeglasses;

said sheet having apertures adjacent two opposite edges thereof for receiving a support when the sheet is folded to bring the apertures into register with each other;

said sheet having two apertures therein spaced apart in a direction perpendicular to a line connecting the first named aperture and positioned adjacent to one of the first named apertures.

2. The invention defined in claim 1 wherein the said two apertures are of rectangular shape to receive the bows of eyeglasses.

3. The invention defined in claim 1 wherein the sheet is a cellulose fiber mat.

References Cited

UNITED STATES PATENTS

| 1,740,134 | 12/1929 | Winston | 206—5 |
| 2,367,182 | 11/1945 | Brown | 206—5 |
| 2,557,552 | 6/1951 | Martin | 150—52 X |
| 2,735,597 | 2/1956 | Treleven. | |

MARTHA L. RICE, *Primary Examiner.*